US011376502B2

(12) United States Patent
Carraway et al.

(10) Patent No.: US 11,376,502 B2
(45) Date of Patent: Jul. 5, 2022

(54) ADJUDICATING FAULT IN A VIRTUAL SIMULATION ENVIRONMENT

(71) Applicant: Microsoft Technology Licensing, LLC, Redmond, WA (US)

(72) Inventors: Devin Leslie Carraway, Lynwood, WA (US); Dan Reuben Weisman, Bellevue, WA (US); Rob Martin Neir, Seattle, WA (US); Michael Grodin, Shoreline, WA (US); Mera Belay Tegene, Carrollton, TX (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 9 days.

(21) Appl. No.: 16/886,498

(22) Filed: May 28, 2020

(65) Prior Publication Data

US 2021/0370180 A1    Dec. 2, 2021

(51) Int. Cl.
*A63F 13/577* (2014.01)
*A63F 13/77* (2014.01)
(Continued)

(52) U.S. Cl.
CPC ............ *A63F 13/577* (2014.09); *A63F 13/56* (2014.09); *A63F 13/75* (2014.09); *A63F 13/77* (2014.09); *G06N 20/00* (2019.01)

(58) Field of Classification Search
CPC ........ A63F 13/56; A63F 13/577; A63F 13/70; A63F 13/71; A63F 13/73; A63F 13/75; A63F 13/77
See application file for complete search history.

(56) References Cited

U.S. PATENT DOCUMENTS

| 6,486,908 B1 * | 11/2002 | Chen | G06T 3/0018 |
| | | | 345/441 |
| 7,224,392 B2 * | 5/2007 | Cahill | H04N 5/2253 |
| | | | 348/315 |

(Continued)

OTHER PUBLICATIONS

Cacho, Gieson, "Preview: 'Ride 3,' 'Supercross 2' Set to Satisfy Motorcycle Itch", Retrieved from: https://www.mercurynews.com/2018/11/30/preview-ride-3-supercross-2-set-to-satisfy-motorcycle-itch/, Nov. 30, 2018, 5 Pages.

(Continued)

*Primary Examiner* — William H McCulloch, Jr.
(74) *Attorney, Agent, or Firm* — Ray Quinney & Nebeker P.C; James Bullough

(57) ABSTRACT

The present disclosure relates to systems, methods, and computer-readable media for adjudicating incidents between players within a simulation environment (e.g., a gaming environment). For example, systems disclosed herein involve training an adjudication model trained to evaluate player data from a plurality of player states over time to determine whether one or more players are at fault for an identified incident within the simulation environment. The systems disclosed herein can maintain a dynamic circular buffer that provides a snapshot of the player data over a predetermined period of time and which provides a scalable and computationally efficient mechanism for evaluating player data for multiple players to determine whether one or more players are violating rules within the simulation environment.

20 Claims, 8 Drawing Sheets

(51) Int. Cl.
*A63F 13/56* (2014.01)
*A63F 13/75* (2014.01)
*G06N 20/00* (2019.01)

(56) References Cited

U.S. PATENT DOCUMENTS

| | | | | |
|---|---|---|---|---|
| 7,739,479 | B2* | 6/2010 | Bordes | A63F 13/577 |
| | | | | 712/1 |
| 8,224,122 | B2* | 7/2012 | Cohen | G06T 3/0018 |
| | | | | 382/298 |
| 8,488,908 | B2* | 7/2013 | Edwards | H04N 1/3876 |
| | | | | 382/284 |
| 8,635,303 | B2* | 1/2014 | Bhogal | A63F 13/85 |
| | | | | 709/217 |
| 8,771,083 | B2* | 7/2014 | Horneff | A63F 13/75 |
| | | | | 463/43 |
| 8,799,034 | B1 | 8/2014 | Brandmaier et al. | |
| 8,954,226 | B1 | 2/2015 | Binion et al. | |
| 8,965,626 | B2 | 2/2015 | Kesavan et al. | |
| 9,646,428 | B1 | 5/2017 | Konrardy et al. | |
| 10,068,615 | B2* | 9/2018 | Nakamura | A63F 13/75 |
| 10,486,070 | B2* | 11/2019 | Fukuda | A63F 13/798 |
| 10,729,980 | B2* | 8/2020 | Mojarad | A63F 13/352 |
| 2005/0075154 | A1* | 4/2005 | Bordes | A63F 13/10 |
| | | | | 463/1 |
| 2006/0202427 | A1* | 9/2006 | McDougal | A63F 13/335 |
| | | | | 273/430 |
| 2006/0209194 | A1* | 9/2006 | Liu | H04N 5/232 |
| | | | | 348/218.1 |
| 2006/0247060 | A1* | 11/2006 | Hanson | G07F 17/32 |
| | | | | 463/42 |
| 2007/0211955 | A1* | 9/2007 | Pan | H04N 5/23238 |
| | | | | 382/254 |
| 2008/0282160 | A1* | 11/2008 | Tonnison | G06F 9/451 |
| | | | | 715/704 |
| 2010/0062833 | A1* | 3/2010 | Mattice | G11B 19/042 |
| | | | | 463/24 |
| 2010/0105484 | A1* | 4/2010 | Horneff | A63F 13/12 |
| | | | | 463/43 |
| 2015/0116293 | A1* | 4/2015 | Nakamura | A63F 13/75 |
| | | | | 345/204 |
| 2017/0007929 | A1* | 1/2017 | Fukuda | A63F 13/52 |
| 2019/0270021 | A1 | 9/2019 | Hume et al. | |
| 2019/0325775 | A1 | 10/2019 | Kuipers | |
| 2020/0206635 | A1* | 7/2020 | Mojarad | H04N 1/32144 |
| 2021/0370180 | A1* | 12/2021 | Carraway | A63F 13/803 |

OTHER PUBLICATIONS

Dogru, et al., "Traffic Accident Detection by Using Machine Learning Methods", In Proceedings of Third International Symposium on Sustainable Development, May 31, 2012, pp. 468-474.

Grigorescu, et al., "A Survey of Deep Learning Techniques for Autonomous Driving", In Repository of arXiv:1910.07738v2, Oct. 17, 2019, 38 Pages.

Walsh, Alan, "Inside Forza Motorsport 7's Race Regulations: A Genre-Defining Learning System", Retrieved from: https://www.fullthrottlemedia.co.uk/article/forza-7-regulations, Dec. 13, 2018, 6 pages.

"International Search Report and Written Opinion Issued in PCT Application No. PCT/US2021/028275", dated Jul. 30, 2021, 14 Pages.

Young, et al., "Cooperative Collision Warning Based Highway Vehicle Accident Reconstruction", In Proceedings of the Eighth IEEE International Conference on Intelligent Systems Design and Applications, Nov. 26, 2008, pp. 561-565.

* cited by examiner

ADJUDICATING FAULT IN A VIRTUAL SIMULATION ENVIRONMENT

BACKGROUND

Advancements in computing devices and network technology have led to a variety of innovations and platforms in providing digital content (e.g., digital media, gaming content) across computer networks. For example, many platforms now exist that are capable of providing realistic simulation content (e.g., gaming content) to end-users across a variety of computing devices. Whether in entertainment, employment training, advertising, or gaming, digital content systems are able to provide digital content to thousands of users via a variety of client devices. Moreover, an ever-increasing number of platforms are able to provide virtual environments within which individuals are able to interact with one another in cooperative and/or competitive simulations (e.g., gameplay).

As virtual simulation environments become more complex, greater leeway is provided to players to act and interact with one another within the environments. While the majority of players within these environments act in accordance with rules and consideration for others, many individuals choose to abuse rules and/or exploit the environment in such a way that other players become frustrated and have a negative experience. Indeed, as more bad actors engage within virtual simulation environments, more and more end-users lose patience and end up disengaging temporarily or permanently from these simulation environments.

While conventional simulation systems (e.g., virtual racing applications) have attempted to enforce rules of conduct between players and with respect to the virtual environment, existing techniques for enforcing rules suffer from a number of difficulties and drawbacks. For example, human driven systems often lack objectivity or adequate manpower to enforce rules on an ever-growing pool of end-users. Indeed, where a virtual gaming environment includes millions of daily users, it becomes prohibitively expensive or procedurally impossible for individuals to review incidents and levy punishment to offending players. Moreover, human adjudicators may introduce inconsistent or otherwise non-uniform determinations of fault and levy inconsistent penalties to end-users.

In addition, existing computerized systems often lack adequate processing power and/or imprecise techniques for adjudicating and enforcing rules of conduct within a virtual environment. Indeed, as simulation environments become more complex and computationally demanding on computer systems, gaming applications and/or wireless networks often cannot spare adequate bandwidth and/or processing resources to adjudicate incidents in a timely manner. Moreover, existing models for determining fault are often overly simplistic and fail to accurately determine fault with a satisfactory level of consistency.

These and other problems exist with regard to adjudicating fault within a virtual simulation environment (e.g., a virtual racing environment).

DETAILED DESCRIPTION

Figure 1:
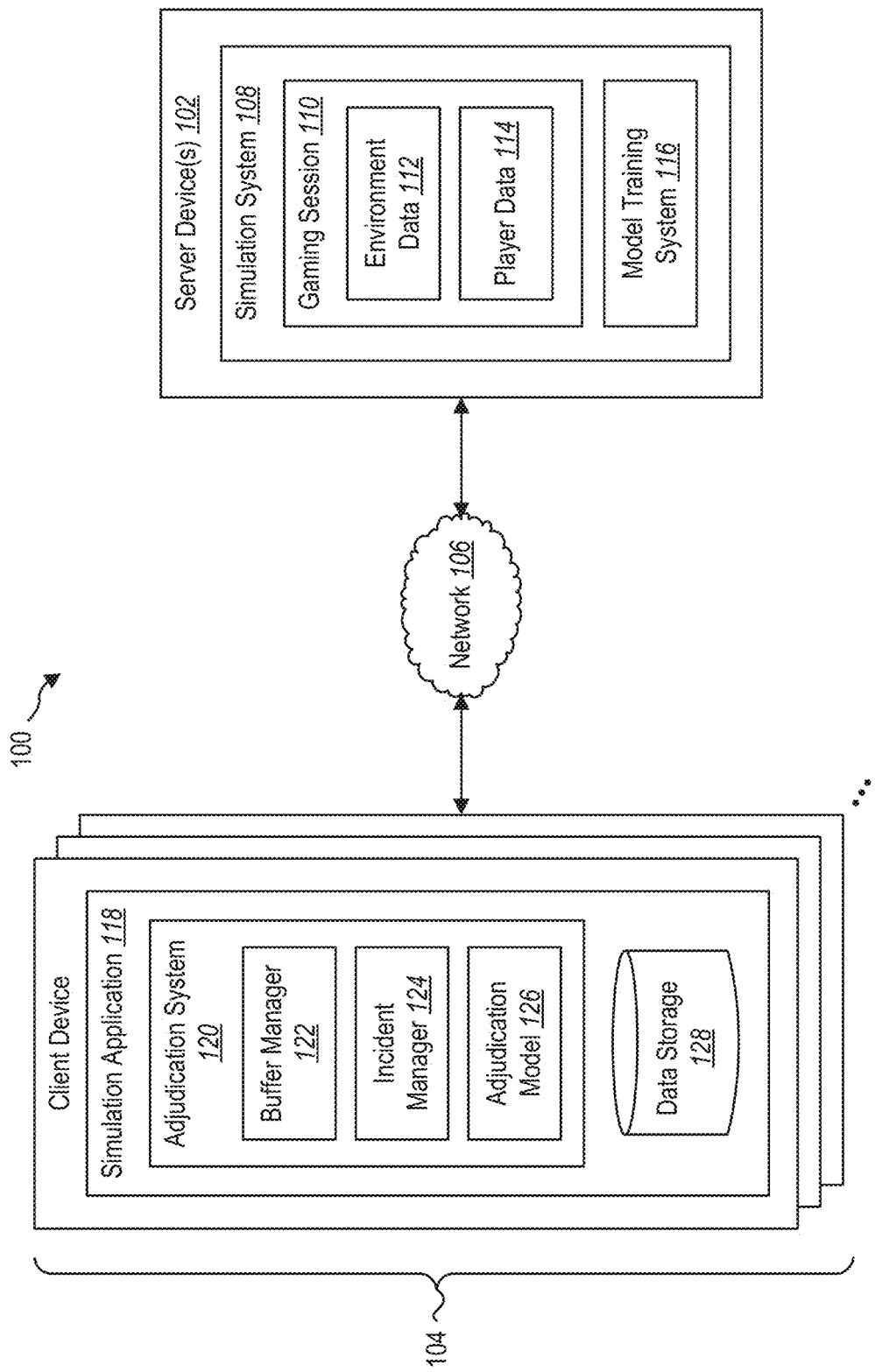
FIG. 1 illustrates an example environment including an adjudication system for adjudicating fault between players of a virtual simulation environment (e.g., a virtual racing environment) in accordance with one or more embodiments.

The present disclosure relates to systems and methods for adjudicating incidents between players (e.g., vehicles, avatars) within a virtual simulation environment (e.g., a virtual racing environment). In particular, as will be discussed in further detail below, an adjudication system of a simulation application (e.g., a gaming application) may be implemented on one or more computing devices to identify an incident (e.g., collision) between players within the simulation environment and determine whether one or more players are at fault in causing the incident (e.g., in violation of one or more rules of the simulation environment). For example, and as will be discussed in further detail below, the adjudication system may implement a machine learning model trained to evaluate player data including various types of player-related data (e.g., physics data, metadata) for one or more players to determine which of one or more players are at fault for an identified incident.

As an illustrative example, an adjudication system may generate a dynamic circular buffer (or simply "circular buffer") that includes captured states of player data over a predetermined period of time within a virtual simulation environment. The adjudication system may detect or otherwise identify an incident between a player (e.g., a vehicle) and one or more additional players (e.g., additional vehicle (s)). In response to the incident, the adjudication system can generate an updated circular buffer including captured states of player data over the predetermined period of time dating back from a conclusion of the incident. The adjudication system can further provide the updated circular buffer to an adjudication model trained to output a fault determination for a given player based on a sequence of recently captured states of player data for the given player.

The present disclosure includes a number of practical applications that provide benefits and/or solve problems associated with conventional systems and techniques for adjudicating incidents between players of a virtual simulation environment. In particular, one or more embodiments described herein relate to an adjudication system that implements a machine learning model trained to determine fault between one or more players in response to an identified incident in which one or more players have potentially committed a violation of established rules for the virtual simulation environment. Indeed, features and functionality of the adjudication system implement an adjudication model for accurately determining fault between players using techniques while expeditiously utilizing computing resources on one or more computing devices.

For example, in one or more embodiments, the adjudication system accurately determines fault for a given incident by implementing a machine learning model trained to evaluate player data for players involved in an incident. In particular, as will be discussed in further detail below, a machine learning model may be trained to receive any number of signals from the captured states of player data to accurately determine which of one or more players are at fault for a given incident. Indeed, in contrast to conventional heuristic models that rely on a simple calculation of a select number of static variables, by implementing machine learning in accordance with examples described herein, the adjudication system can achieve significantly more accurate results than conventional systems without relying on human adjudicators.

In addition to more accurately determining fault for a given incident, the adjudication system can utilize fewer processing resources by dynamically generating a circular buffer that provides a current snapshot of player data over a predetermined period of time. For example, the adjudication system can periodically capture states of a player over time and, in response to a detected incident, generate an updated circular buffer by simply identifying a current version of the circular buffer at a time when the incident resolves. In one or more embodiments, the adjudication system can provide the current version of the circular buffer (e.g., the updated circular buffer) as an input to the adjudication model (e.g., the machine learning model) upon resolution of the incident.

The adjudication system can further limit utilization of computing resources in a number of ways. For example, and as will be discussed in further detail below, rather than capturing video frames and/or video content for analysis in determining fault, the adjudication system can capture physics data, player metadata, and other player-related data as it exists at points in time to include as part of the circular buffer. Accordingly, player data for a given player may involve a manageable (and scalable) quantity of storage (e.g., 2 MB) for the circular buffer at a specific point in time.

As another example, the adjudication system can apply the adjudication model to the circular buffer (e.g., a current or updated circular buffer) as a background process of a simulation application (e.g., a gaming and/or racing application). In particular, by running the adjudication model as a background process, the adjudication system can selectively apply the adjudication model during a low demand period of the application or may simply run the process at a slow computing speed so as to not interfere with bandwidth and/or processing resources needed to provide a high quality simulation environment to an end-user.

Features and functionality of the adjudication system further provide a scalable process that has a negligible effect on bandwidth and availability of processing resources for the simulation application. For example, as will be discussed below, the adjudication model may be implemented on each of multiple client devices (e.g., gaming consoles). By locally implementing the adjudication model on respective client devices, the adjudication system can prevent overutilization of processing resources on a server system that is hosting virtual environments for 100s or 1000s of end-users simultaneously. Moreover, by implementing the adjudication model on respective devices, those client devices associated with players involved in various incidents may selectively apply the adjudication model without requiring that every console run the model in response to all incidents.

As illustrated in the foregoing discussion, the present disclosure utilizes a variety of terms to described features and advantages of an adjudication system within a variety of computing environments. Additional detail will now be provided regarding the meaning of some of these terms.

As used herein, a "virtual simulation environment," "virtual environment," or "simulation environment" may be used interchangeably to refer to a space or environment in which digital objects (e.g., vehicles, avatars) can move about from location to location within the space. The simulation environment may refer to a digital representation of a two or three-dimensional space provided by a simulation application (e.g., a gaming application). This may include a digital space as viewed through a graphical user interface, a virtual reality (VR) interface, an augmented reality (AR) interface, or any interface that provides a display of computer-generated digital content. In one or more implementations described herein, a simulation environment refers specifically to a gaming environment hosted by or otherwise provided by a gaming application. More specifically, one or more embodiments described herein refer to a racing simulation environment in which players (e.g., vehicles) may race one another in a digital racing simulation.

As used herein, a "player" may refer to a digital representation of a user or player within the simulation environment. For instance, a player may refer to any avatar, vehicle, or digital object representative or otherwise in control by a user of a client device. In one or more embodiments described herein, a player may refer specifically to a vehicle capable of moving from location to location within the simulation environment in accordance with inputs provided by an end-user. For example, a user may control a player (e.g., a vehicle) within a racing simulation environment by providing input signals to a gaming console using a gaming controller or other input device connected to or otherwise in communication with the gaming console (e.g., via a wired or wireless connection).

As used herein, an "incident" may refer to any detectable instance that involves two or more players within a simulation environment in which one or more players may be suspected of violating one or more rules or preferences associated with the simulation environment. For example, an incident may refer to a detectable trigger condition, such as a detected collision or conflict between two or more players in the simulation environment. In one or more embodiments described herein, an incident may refer to a collision between two (or more) vehicles in which the two vehicles come into contact with a threshold measure of force. As will be discussed in further detail below, a variety of criteria may be used to determine whether a given collision or conflict between two or more players constitutes an incident.

As used herein, a "captured state" or "player state" may refer to a snapshot or state of a player within the simulation environment at a given point in time. In particular, a captured state may refer to a captured state of a player at a corresponding point in time indicating physics data and metadata for the player at the corresponding point in time. For instance, in the context of a racing simulation application, a state of a player may include any number of signals descriptive of movement, user inputs, position, user metadata, or any data relevant to the player (or other player involved in an incident) at the given point in time. As used herein, a "current state" or "current snapshot" may refer to a most recent captured state for a player within the simulation environment.

As mentioned above, a captured state having player data may include any number of data signals representative of a state of a player at a given time. In accordance with one or more embodiments described herein in which the simulation environment refers to a racing simulation environment, example signals of a captured state may include a measure of throttle, a status of a brake (e.g., foot brake, hand brake), steering angle, or any other input-related signal. Other examples of signals of a captured state may include how fast a player (e.g., a vehicle) is moving, an angle of movement relative to a direction of the player, or other motion-related data of the player. Other examples signals may include position-related data, such as a position of a player relative to another player or whether a player is at an expected position (e.g., on/off track). Other example signals may include metadata for the player or end-user associated with the player, such as historical incident or adjudication data.

In one or more embodiments, the adjudication system generates a circular buffer including player data over a period of time. As used herein, a "circular buffer" refers to a series of captured states for a player over a predetermined period of time (e.g., 10, 15 seconds). For instance, a circular buffer may refer to a running buffer including snapshots taken over a predetermined period. As will be discussed in further detail herein, a "current circular buffer" or "current version of a circular buffer" may refer interchangeably to a circular buffer including a current captured state (e.g., a most recently captured state) for a player and a plurality of captured states for the player dating back the predetermined duration of time or a predetermined number of captured states. (e.g., 15 seconds and/or 180 captured states). In one or more embodiments described herein, a current circular buffer refers to a circular buffer as it exists as an identified conclusion of an incident. Further detail in connection with obtaining a current version of a circular buffer is discussed below.

As mentioned above, a circular buffer may be used in conjunction with an adjudication model to determine whether one or more players are at fault for a given incident. As used herein, an "adjudication model" may refer to any model or algorithm(s) trained to generate an output including an indication of fault (or no fault) for a player involved in an incident based on input signals from one or more captured states of the player and/or one or more additional players involved in the incident. The adjudication model may refer to one or more computer algorithms, a classification model, or other model capable of outputting an indication of fault. In one or more embodiments, the adjudication model refers specifically to a deep learning model such as a neural network (e.g., convolutional neural network, regression neural network) or other machine learning architecture trained to analyze physics data, metadata, and any other player data to determine whether the player (or other player) is at fault for causing an incident within the simulation environment.

Additional detail will now be provided regarding an adjudication system in relation to illustrative figures portraying example implementations. For example, FIG. 1 illustrates an example environment 100 including one or more server device(s) 102 and any number of client devices 104. The server device(s) 102 may refer to one or multiple cloud computing devices within a network of computing devices on a cloud computing system. Alternatively, the server device(s) 102 may refer to any computing device capable of implementing features and functionality of components or sub-components of a simulation system 108 implemented thereon.

The client devices 104 may refer to various types of computing devices. For example, one or more client devices 104 may include a mobile device, such as a mobile telephone, a smart phone, a personal digital assistant (PDA), a tablet, a laptop, or a wearable device (e.g., a VR or AR headset). Additionally, or alternatively, the client devices 104 may include one or more non-mobile devices such as a desktop computer, gaming console, or other non-portable device. In one or more examples described herein, the client devices 104 are referred to as gaming systems or gaming devices including or coupled to a display device for displaying digital content. Nevertheless, features and functionality described in connection with gaming consoles and gaming applications may apply to any of a variety of types of client devices. Additional detail in connection with an example computing device, which may include general features of the client device 104 and/or server device(s) 102 is discussed below in connection with FIG. 5.

As shown in FIG. 1, the server device(s) 102 and the client devices 104 may communicate with each other directly or indirectly through a network 106. The network 106 may include one or multiple networks and may use one or more communication platforms or technologies suitable for transmitting data. The network 106 may refer to any data link that enables transport of electronic data between devices and/or modules of the environment 100. The network 106 may refer to a hardwired network, a wireless network, or a combination of a hardwired and a wireless network. In one or more embodiments, the network 106 includes the Internet.

As illustrated in FIG. 1, the server device(s) 102 includes a simulation system 108. The simulation system 108 may host a gaming session 110 accessible to one or multiple users (e.g., players) of the simulation system 108. For example, the simulation system 108 may host a gaming session 110 including a shared simulation environment accessible to players corresponding to the plurality of client devices 104 in which the client devices 104 obtain access to the simulation environment via simulation applications 118 on the client devices 104. The simulation system 108 may host any number of gaming sessions in which sets of players may cooperatively and/or competitively interact with one another.

While the gaming session 110 may refer to any of a variety of types of simulation sessions that includes any number of players within a variety of virtual environments (e.g., open-world environments, racing environments, competitive and/or cooperative environments), one or more embodiments described herein refer to a gaming session 110 that includes a number of players that race one another within a virtual racing environment. The gaming session 110 may refer to one or multiple events (e.g., races) that take place in a single or across multiple simulation environments. For example, a gaming session 110 may include one or multiple races between the same or different sets of players.

As shown in FIG. 1, the gaming session 110 may include environment data 112. The environment data 112 may include any data related to a simulation environment within which players associated with the client devices 104 may interact. For example, the environment data 112 may include parameters of a virtual space including physics laws, movement rules, and various settings or parameters that define how the players are able to move throughout the simulation environment. The environment data 112 may further include digital objects such as obstacles, locations within the virtual space, and other details of the simulation environment that may be engaged with or otherwise consumed by users of the client devices 104. Moreover, the environment data 112 may include rules or conduct parameters indicating types of behavior or interactions between players that may be penalized by the simulation system 108. The environment data 112 may include information associated with multiple virtual spaces. For example, where multiple players are set to race against other players on multiple tracks, the environment data 112 may include data for each of the different tracks and associated environments.

In addition to environment data 112, the gaming session 110 may include player data 114. The player data 114 may include any data associated with one or more players within the simulation environment hosted by the simulation system 108. For example, the player data 114 may include user information, such as account information and a player history within the gaming session 110 and one or more previous gaming sessions. The player data 114 may further include information about the player with respect to the simulation environment, such as a position of the player, movement of the player, or information related to how the player is interacting with the simulation environment. In one or more embodiments, the player data 114 may additionally include any of the information contained within a circular buffer.

As further shown, the simulation system 108 includes a model training system 116. The model training system 116 may implement features related to training an adjudication model (e.g., a machine learning model) to determine fault in connection with an incident between two or more players within a simulation environment. For instance, the model training system 116 may receive training data including captured player data for players involved in incidents and associated truth data indicating metrics of fault (e.g., human determined metrics of fault) for the players. In one or more embodiments, the model training system 114 receives training data for hundreds or thousands of incidents and generates a machine learning adjudication model trained to simulate the truth data associated with the corresponding incident information. For example, in connection with a racing application, the machine learning adjudication model may be trained to determine whether a player is at fault in connection with a collision between the player and another player (or multiple players) within the virtual racing environment.

After deployment of the adjudication model, the model training system 114 may additionally refine the adjudication model based on additional training data received from various sources. For example, as results of applying the adjudication model to incidents are received and certain types of incidents are found to be incorrectly adjudicated, the model training system 114 can identify additional test data including incident information for specific types of incidents and associated ground truths to fine-tune algorithms and parameters of the adjudication model to more accurately determine fault with respect to a wider range of incidents. Additional information in connection with training and refining the adjudication model in accordance with one or more embodiments is discussed in further detail below.

One or more components or sub-components of the simulation system 108 may be implemented across different server devices. As an example, the gaming session may be hosted from a first server device while the model training system is implemented on another server device. Further, the components and sub-components of the simulation system 108 may be implemented on the same network of server device (e.g., the same cloud computing system) or across server devices on different networks of server devices (e.g., different datacenters or different cloud computing systems).

As shown in FIG. 1, the environment 100 includes a plurality of client device 104. The client devices 104 may refer to any device that enables a user to engage with the simulation environment and/or control movement of a player within the simulation environment. For example, the client device 104 may refer to a gaming console, a mobile device, and input device, or combination of multiple devices (e.g., a controller and console) or any other computing device capable of running a simulation application 118 and interacting with the simulation system 108 on the server device(s) 102.

While the client devices 104 may refer to different types of client devices having different capabilities and/or processing resources, each of the client devices 104 may include a simulation application 118 thereon having similar features and functionality described herein across the different client devices. As shown in FIG. 1, the simulation application 118 includes an adjudication system 120. The adjudication system 120 may include a buffer manager 122, an incident manager 124, and an adjudication model 126. The adjudication system 120 may further include a data storage 128 including data stored thereon and accessible to components and sub-components of the simulation application 118.

In one or more embodiments, the simulation application 118 refers to a software application that runs on a client device to provide access to a simulation environment hosted by the simulation system 108. For example, each of multiple computing devices having the simulation application 118 implemented thereon may engage in a multiplayer environment in which multiple players may simultaneously interact with and engage within the simulation environment.

While the simulation application 118 may include any number of systems or components related to all available features of the simulation application 118, additional detail will be discussed herein in connection with an adjudication system 120 implemented on the simulation application 118. In particular, the adjudication system 120 may refer to a program or feature(s) of the simulation application 118 related to identifying and adjudicating incidents between players of the gaming session 110 (e.g., players interacting within the simulation environment).

As mentioned above, and as shown in FIG. 1, the adjudication system 120 may include a buffer manager 122. The buffer manager 122 may generate a circular buffer including captured states of player data for a player over a period of time. In one or more embodiments, the buffer manager 122 captures player states at periodic intervals (e.g., 10-14 times/second) and maintains a dynamic circular buffer representative of player data over a period of time (e.g., 10-20 seconds). In particular, as discussed above, the dynamic circular buffer may include a series of captured player states over the period of time. In one or more embodiments, the buffer manager 122 continuously generates a dynamic circular buffer for each player for which the simulation application 118 has relevant data. Additional information in connection with generating and maintaining a circular buffer is discussed below in connection with FIGS. 2A-3E.

As further shown, the adjudication system 120 includes an incident manager 124. The incident manager 124 may be used to detect an incident between a player and other players within the gaming session 110. For example, the incident manager 124 can detect a trigger condition related to movement of two or more players and determine that an incident has occurred or is ongoing between two or more players. For instance, where the simulation application 118 is a racing application, the incident manager 124 can detect a collision between two (or more) players and determine that an incident has occurred based on a calculated physics measure (e.g., a measure of force between the players) and/or an identified impact within the simulation (e.g., a material impact of a player trajectory as a result of the collision).

The adjudication system 120 may additionally include an adjudication model 126 trained to determine a measure of fault for an identified incident. As mentioned above, the adjudication model 126 may refer to a machine learning model trained (e.g., using the model training system 116) to receive an input of a plurality of player states (e.g., a circular buffer) and output a determination of fault based on player data included within the plurality of player states. For example, and as will be discussed in further detail below, the simulation application 118 may apply the adjudication model 126 to one or multiple circulation buffers corresponding to each of multiple players involved in an identified incident and determine which (if any) of the players are at fault or acted in violation of rules in causing the incident between the players.

As further shown, the adjudication system 120 includes a data storage 128 including data usable by the components of the adjudication system 120 to identify an incident and/or determine a metric of fault (e.g., player at fault, player not at fault) for one or more players in connection with the incident. For example, the data storage 128 may include any player data including one or more circular buffers corresponding to players within the gaming session 110. As another example, the data storage 128 may include incident data or rule data indicating conditions or rules to determine whether an incident has occurred (or resolved) between two or more players within the gaming session 110. As a further example, the data storage 128 may include model data including any parameters, signals, or other information used in implementing the adjudication model 126.

As shown in FIG. 1, the simulation application 118 may be implemented on each of multiple client devices 104. In one or more embodiments, the adjudication system 120 may be implemented on each of multiple client devices 104. In some implementations, client devices specifically associated with players involved in an identified incident selectively apply the adjudication model 126 to the player data to determine whether a player is at fault. In this way, the simulation application 118 can adjudicate fault in connection with an identified incident on a local device rather than utilizing network bandwidth and/or server resources in a way that could affect gameplay of the simulation application 118.

The components 108-128 of the systems described herein may include hardware, software, or both. For example, the components of the simulation system 108 and simulation application 118 may include one or more instructions stored on a computer-readable storage medium and executable by processors of one or more computing devices. When executed by the one or more processors, the computer-executable instructions of one or more computing devices can perform one or more techniques and processes described herein. Alternatively, the components 108-128 of the systems and applications can include hardware, such as a special purpose processing device to perform a certain function or group of functions. Additionally, or alternatively, the components 108-128 of the systems and applications can include a combination of computer-executable instructions and hardware.

Figure 2A:
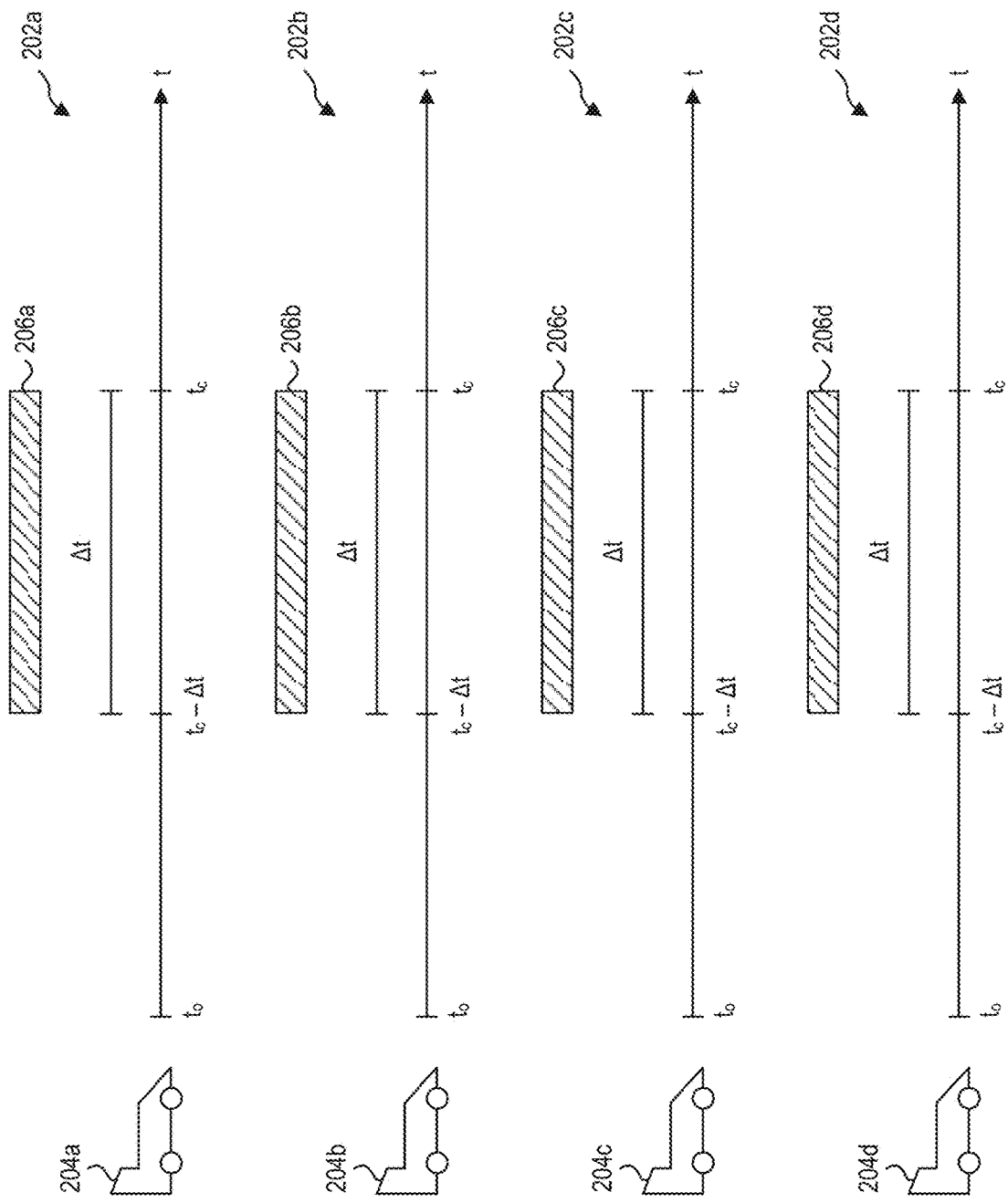
FIGS. 2A-2B illustrate an example implementation of capturing and analyzing dynamic circular buffers for determining fault between players of a virtual simulation environment in accordance with one or more embodiments.

Additional detail will now be discussed in connection with generating and maintaining a circular buffer in accordance with one or more embodiments. For example, FIG. 2A shows an example implementation of timelines 202a-d for four players 204a-d (e.g., players A-D) within a simulation environment provided via a gaming session (e.g., the gaming session 110). In particular, the implementation shown in FIG. 2A shows a series of timelines 202a-d corresponding to four players 204a-d engaged with the simulation application 118 on respective client devices (e.g., gaming devices).

As discussed above, and as shown in FIG. 2A, the simulation application 118 can generate and maintain a circular buffer for each of the players 204a-d. For example, the simulation application 118 can maintain a first circular buffer 206a for a first player 204a, a second circular buffer 206b for a second player 204b, a third circular buffer 206c for a third player 204d, and a fourth circular buffer 206d for a fourth player 304d. Where the gaming session includes more players, the simulation application 118 can maintain circular buffers for each of the players interacting within the simulation environment. In this example, the players 204a-d refer specifically to racecars engaged in a racing application.

As shown in FIG. 2A, each of the circular buffers 206a-d have a similar length and extend over a similar time period of the timelines 202a-d. In particular, each of the circular buffers 206a-d terminate at a current time ($t_c$) or at a time corresponding to when a most recent player state was captured for each of the players 204a-d. Further, each of the circular buffers 206a-d may have a length corresponding to a predetermined time ($\Delta t$). For example, in one or more embodiments, each of the circular buffers 206a-d may include player data corresponding to a fifteen (15) second (or other interval of time). For instance, the circular buffers 206a-d may include player states captured every five frames (or other sample rate) over the fifteen second period of time. In one or more implementations, the circular buffers 206a-d have a specific length corresponding to a predetermined number of captured states (e.g., 180 player states) that the simulation application 118 is configured to include within the circular buffers 206a-d.

One or more implementations of the simulation application 118 may utilize different periods of time or different numbers of states depending on various factors. For example, where a nature of the simulation application 118 may require player data over more time (or less time), the simulation application 118 can maintain circular buffers 206a-d of longer lengths of time (or having more player states). In addition, or as an alternative, depending on the types of incidents that the adjudication model 126 is trained to adjudicate, the simulation application 118 can similarly adjust the duration or number of player states that make up the circular buffers 206a-d.

In one or more embodiments, the simulation application 118 generates circular buffers having a specific duration and/or a number of player states depending on processing capabilities of a client device and/or processing demands of the simulation application 118. For example, where the simulation application 118 is a fast-moving game or requires a significant quantity or bandwidth of processing resources, the simulation application 118 may reduce a time period over which the circular buffers 206a-d are maintained in order to allocate more processing resources to the simulation application 118. Alternatively, where a client device has more than sufficient processing resources or available bandwidth, the simulation application 118 can increase a duration or number of frames that make up the circular buffers 206a-d.

Figure 2B:
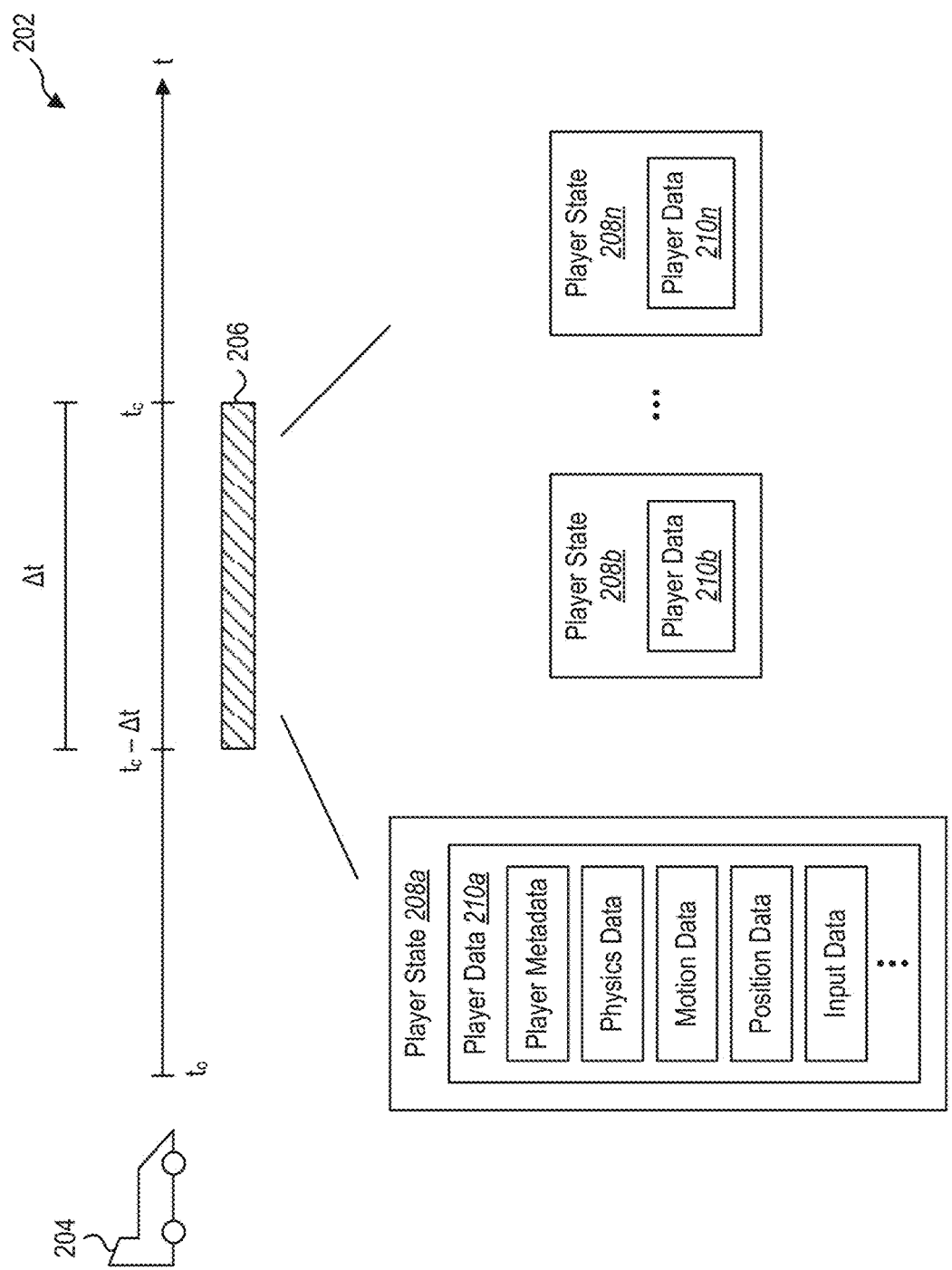

FIG. 2B illustrates a more detailed implementation of an example circular buffer 206 corresponding to a player 204. In particular, FIG. 2B shows an example timeline 202 for the player 204 and a duration window over which a circular buffer 206 is generated and maintained by the simulation application 118. As shown in FIG. 2B, the simulation application 118 can include a plurality of player states 208a-n over a predetermined period of time or a predetermined number of captured player states. In one or more embodiments, the player states 208a-d correspond to specific video frames of video content provided by the simulation application 118.

As shown in FIG. 2B, each of the player states 208a-n include player data 210a-n corresponding to the player 204. In particular, each of the player states 208a-n may include player data 210a-n corresponding to different points in time over the predetermined period of time shown in the example timeline. More specifically, the circular buffer 206 may include player data representative of sampled player states at different points in time from a first timestamp $(t_c-\Delta t)$ corresponding to a least recent timestamp of the player states 208a-n to a current timestamp $(t_c)$ corresponding to a most recent timestamp of the player states 208a-n.

Each of the player states 208a-n may include similar types of player data 210a-n captured at respective timestamps. For example, a first player state 208a may have player data 210a including a variety of different types of player data. By way of example and not limitation, FIG. 2B illustrates various examples of different types of player data 210. For example, the player data 210a may include player metadata. The player metadata may include player profile data, user account data, and historical data for a user and/or the player. Indeed, the player metadata may include any information descriptive of the player and/or user of an account associated with the player.

In one or more implementations, the player data 210a includes physics data including metrics of momentum, friction, velocity, or any metric of force applied to a player by any object within the simulation environment. For example, the physics data may include a measure of friction between tires of a car and a track surface, a measure of speed within the simulation environment, and/or a metric of force at a point of collision between two players. The player data 210a may further include motion data (e.g., in addition to or as a subset of the physics data) including any motion-related data such as a direction of movement, a velocity of movement, and movement relative to other objects within the simulation environment. For example, the motion data (or physics data) may include a measure of yaw indicating rotational movement of the player relative to a direction of motion.

Other types of player data 210a may include position data (e.g., coordinates of the player, a position of the player relative to an expected position, an on-track v. off-track status for the player), input data (e.g., input commands, activated controls of the vehicle), or any other player-related data that the simulation application 118 may capture at a specific point in time. Indeed, the simulation application 118 can capture hundreds or thousands of signals including any type of description of a state of the player within the simulation environment at a specific point in time. These signals may be compiled within the player data of a given player state. Each of the additional player states 208b-n may include similar types of player data shown in the first player state 208a.

While one or more embodiments of the circular buffer 206 may include a set of player states sampled at a predetermined frequency (e.g., every five frames of video content), the simulation application 118 may generate the circular buffer 206 in a number of ways. For example, in one or more implementations, the simulation application 118 incrementally updates the circular buffer based on sampled player states as the player states are captured by the simulation application 118. For example, the simulation application 118 may simply append each captured player state to an end of a current version of the circular buffer 206 while removing a least frequent captured player state.

In addition, or as an alternative, in one or more embodiments, the simulation application 118 may perform one or more actions to ensure that a critical player state corresponding to a collision frame (e.g., a video frame showing an actual collision between the players) is included within the circular buffer 206. As an example, the simulation application 118 may capture player states at a full sample rate (e.g., 60 frames/second) to include player data for each frame of digital content. Upon detecting an incident and upon determining that the incident has resolved, the simulation application 118 can resample the circular buffer 206 at a lower frame rate using the collision or critical frame as a reference point. In this way, the simulation application 118 can ensure that the circular buffer includes player data for the critical frame when the two or more players collide or at an identified critical moment signaling the beginning of the incident.

Figure 3A:
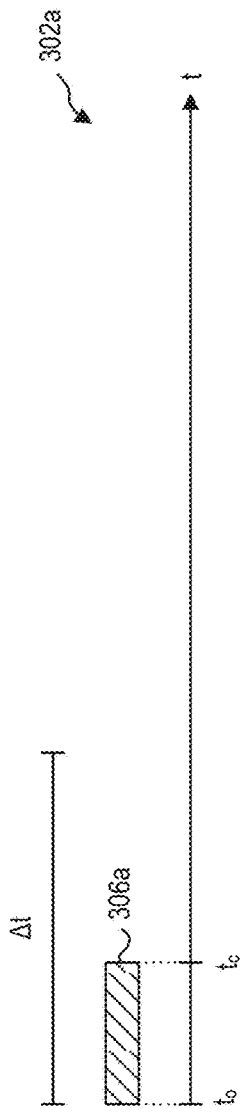
FIGS. 3A-3E illustrates an example implementation of generating an updated or current version of the dynamic circular buffer for use in adjudicating fault between players of a virtual simulation environment in accordance with one or more embodiments.

FIGS. 3A-3E illustrate an example implementation of maintaining a dynamic circular buffer in accordance with one or more embodiments. In particular, FIG. 3A illustrates a first timeline 302a for a player 304 showing an initial generation of a circular buffer 306a as it would exist at a current time $(t_c)$ of the first timeline 302a. For example, upon startup of the simulation application 118 and/or upon entrance of the player 304 into a simulation environment, the simulation application 118 can begin generating a circular buffer at an initial time $(t_0)$ by capturing player states and adding the player states to the circular buffer. As shown in this example, the circular buffer at $t_c$ within the first timeline 302a includes one or more captured states extending from the $t_0$ to $t_c$.

Figure 3B:
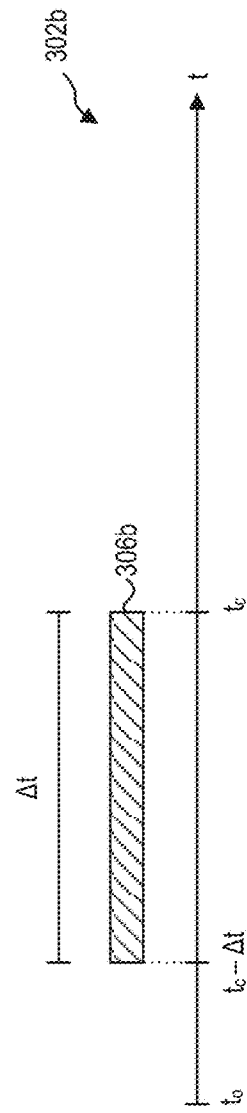

Moving on, FIG. 3B shows an implementation of maintaining the circular buffer for the player 304 shown in FIG. 3A at a second timeline 302b after some time has passed. In particular, as shown in FIG. 3B, the simulation application 118 can update the circular buffer to generate an updated circular buffer 306b including a representation of player data over a predetermined duration of time $(\Delta t)$. As a result, the updated circular buffer 306b includes a plurality of captured player states for the player 304 from a first timestamp $(t_c-\Delta t)$ to a current timestamp $(t_c)$ shown in the second timeline 302b. As discussed above, the predetermined duration of time may be some predetermined number of seconds (e.g., 15 seconds) or a predetermined number of captured states (e.g., 180 captured player states).

Figure 3C:
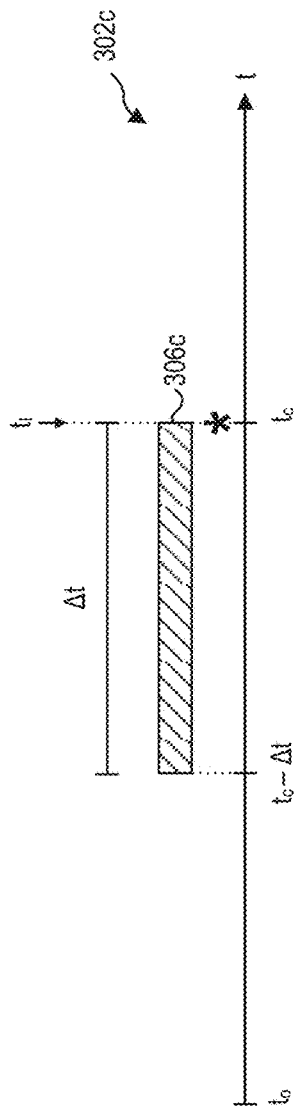

FIG. 3C illustrates an example timeline 302c indicting a beginning of an incident that involves the player 304. For example, at a current timestamp $(t_c)$, the player 304 may collide with another player (or the other player may collide with the player 304) within the simulation environment. At the initiation of the incident (at timestamp $t_I$), the dynamic circular buffer 306c may include a rolling plurality of player states representative of captured player states for the player 304 from the first timestamp $(t_c-\Delta t)$ to a current timestamp $(t_c)$ shown in the third timeline 302c.

Figure 3D:
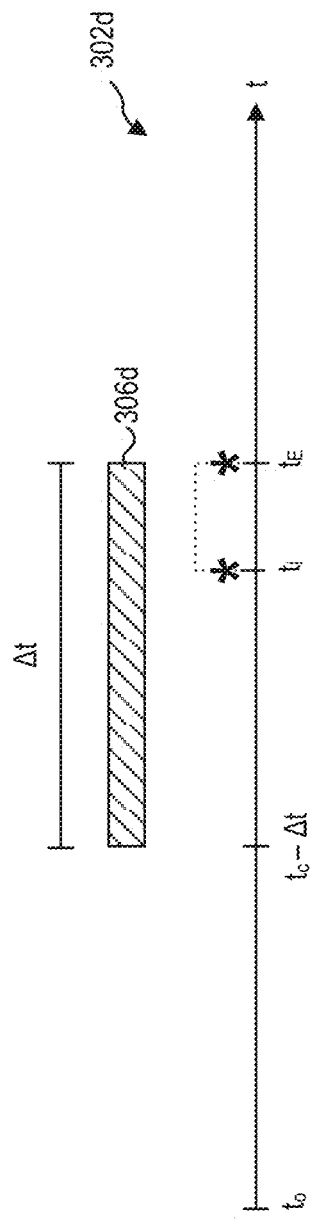
Figure 3D:
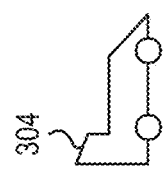

FIG. 3D illustrates another example timeline 302d showing the progression of the circular buffer over the duration of the incident. In particular, as shown in FIG. 3B, the simulation application 118 can continue updating the circular buffer to generate an updated circular buffer 306d representative of a plurality of player states at the end of the incident (at timestamp $t_E$). As shown in FIG. 3D, the dynamic circular buffer 306d may include player states representative of captured player states for the player 304 from the first timestamp ($t_c - \Delta t$) to a current timestamp ($t_c$) shown in the fourth timeline 302d.

Figure 3E:
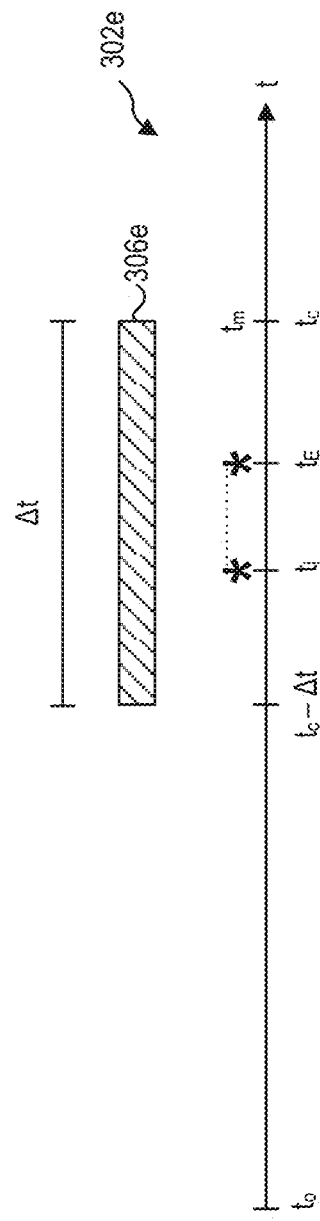
Figure 3E:
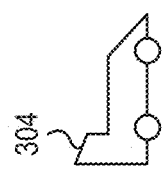

In one or more embodiments, the simulation application 118 determines a monitor time ($t_M$) corresponding to a point at which a current circular buffer likely includes player states representative of the entire incident, which may include build up to the incident as well as aftermath of the incident. As an example, FIG. 3E illustrates an example timeline 302e showing an updated circular buffer 306e as it exists at a monitor time ($t_M$). The monitor time ($t_M$) may refer to an arbitrary or predetermined point in time after conclusion of an incident (e.g., after a collision between players is no longer taking place). In one or more embodiments, the monitor time ($t_M$) may refer to some predetermined timestamp after an identified conclusion of the incident (e.g., 2 seconds after conclusion of the incident).

While not shown in FIGS. 3A-3E, the simulation application 118 may continue capturing player states and updating the circular buffer for a duration of the gaming session so long as the player 304 is within the virtual environment. Nevertheless, as will be discussed in further detail below in connection with FIG. 4, the simulation application 118 can identify the dynamic circular buffer 306e as it exists at the monitor time ($t_M$) to generate, identify, or otherwise obtain a current circular buffer. In one or more embodiments, the simulation application 118 simply saves or stores a copy of the current circular buffer 306e and continues updating the dynamic circular buffer while the player 304 continues to interact with other players and the simulation environment.

Figure 4:
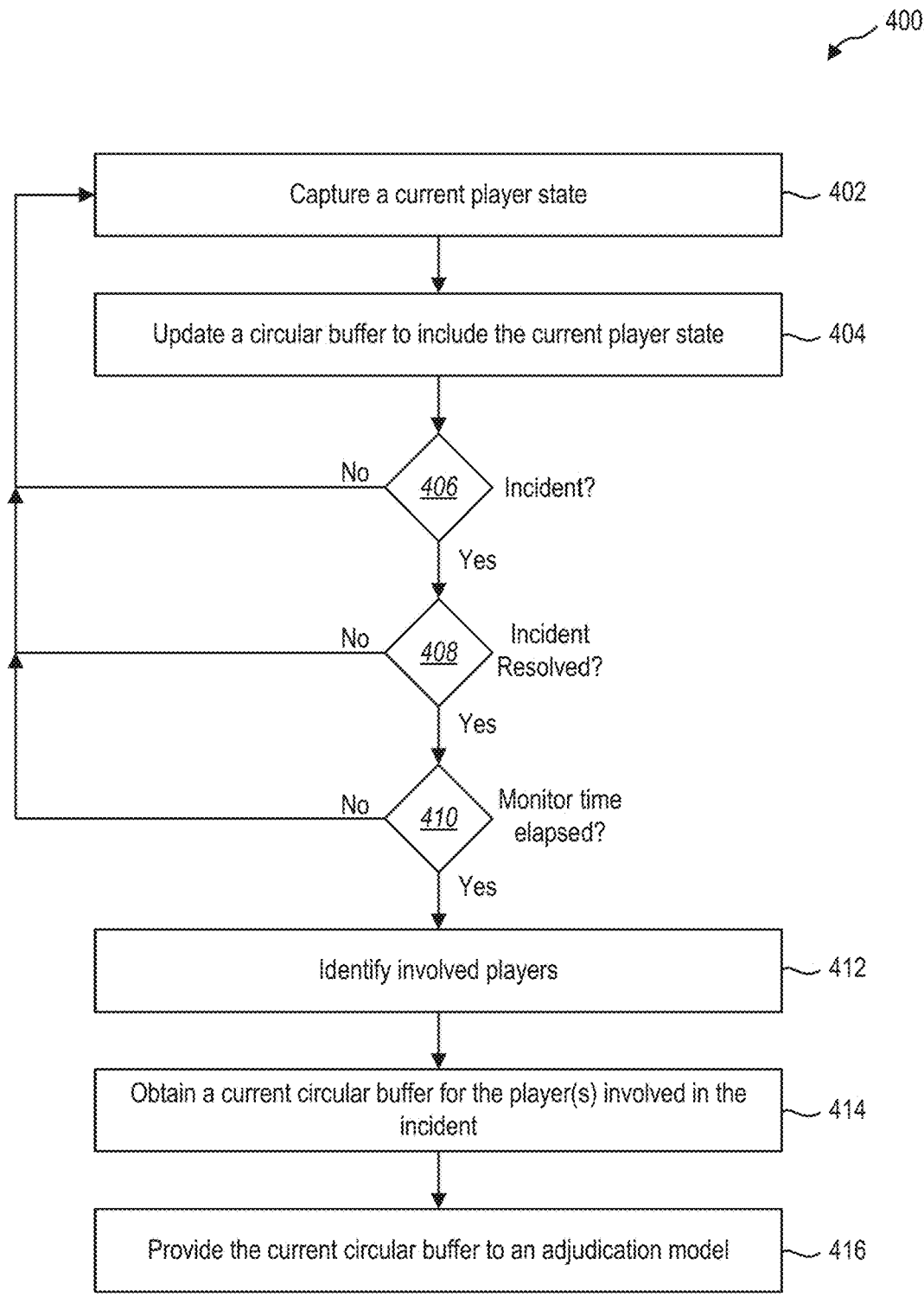
FIG. 4 illustrates an example workflow indicating an example implementation of the adjudication system in accordance with one or more embodiments.

FIG. 4 illustrates an example workflow 400 showing an example sequence of acts that a simulation application 118 and/or the simulation system 108 can perform in accordance with one or more embodiments described herein. For example, As shown in FIG. 4, a simulation application 118 can perform an act 402 of capturing a current player state. In accordance with examples described above, this may include capturing a snapshot or state of a player within a simulation environment at a current moment in time (e.g., a current timestamp).

As shown in FIG. 4, the simulation application 118 can perform an act 404 of updating a circular buffer to include the current player state. For instance, the simulation application 118 can append the current player state to an existing version of the circular buffer. In one or more embodiments, the simulation application 118 may discard a least recent player state from the previous version of the circular buffer.

For example, where the circular buffer includes a full fifteen seconds of player data (e.g., or some other predetermined threshold period of time), the simulation application 118 can update the circular buffer by adding the current player state captured in performing act 402 and discarding a least recent captured state from fifteen seconds earlier. Alternatively, where a player recently entered the simulation environment and where the circular buffer does not yet include a full fifteen seconds of player data, the simulation application 118 can update the circular buffer by simply adding the current player state to the previous version of the circular buffer.

As further shown in FIG. 4, the simulation application 118 can perform an act 406 of determining whether an incident has occurred (or is currently underway). As an example, and as discussed above, the simulation application 118 can detect whether a player has collided (or is currently colliding) with another player within the simulation environment.

While one or more embodiments may involve simply detecting whether one player has come into contact with another player, the simulation application 118 may determine an incident in a number of ways. For instance, where players may come into contact frequently and in accordance with rules of a gaming session, the simulation application 118 can apply one or more additional rules to determine whether an interaction between two or more players qualifies as an incident. For example, the simulation application 118 may determine whether two or more players have collided with a threshold quantity of force or that two or more players have collided multiple times over a short period of time. In one or more embodiments, the simulation application 118 can apply incident detection rules that lump multiple collisions between one or multiple players within a threshold period of time as a single instance of an incident (e.g., rather than recognizing or detecting multiple incidents for each collision or discrete interaction between two or more players). Indeed, the simulation application 118 can apply any number of rules or parameters in determining whether an incident has occurred.

As shown n FIG. 4, where the simulation application 118 determines that an incident has not occurred or where an incident is not currently underway, the simulation application 118 can proceed to act 402 and capture another current player state. Alternatively, where the simulation application 118 determines that an incident has occurred or is currently underway, the simulation application 118 can proceed to act 408 and determine whether the incident has resolved.

Similar to determining whether an incident has occurred or is currently underway, the simulation application 118 can apply rules and parameters to determine whether an incident has resolved. For example, the simulation application 118 can determine that an incident has resolved based on detecting that two or more players are no longer colliding. In one or more embodiments, the simulation application 118 may determine that an incident has resolved based on a threshold period of time passing without two or more players actively colliding or otherwise interacting with one another within the simulation environment. Indeed, any number of criteria may be applied to determine whether an incident has resolved.

As shown in FIG. 4, where the incident has not yet resolved, the simulation application 118 can proceed to act 402 and capture another current player state. Alternatively, where the simulation application 118 determines that the incident has resolved, the simulation application 118 can proceed to act 410 and determine whether a monitor time has elapsed.

At act 410, the simulation application 118 can determine whether a monitor time has elapsed from a detected end of the incident. For example, upon detecting a resolution of the incident, the simulation application 118 can initiate a timer that continues so long as one or more players do not collide or otherwise perform an action that would qualify as an incident. If the monitor time elapses without detecting another incident, the simulation application 118 can determine that the monitor time has elapsed, signaling the end of the identified incident. Accordingly, as shown in FIG. 4, where the monitor time has not elapsed since the resolution of an identified incident, the simulation application 118 can return to act 402 and capture another current player state.

Alternatively, where the monitor time has elapsed, the simulation application 118 can proceed to act 412 and identify the involved players of the incident. As mentioned above, the simulation application 118 can generate or otherwise maintain circular buffers for any number of players within the simulation environment. Accordingly, the simulation application 118 may have access to a current version of the circular buffer for each of the players at any point in time while the player engages within the simulation environment. Thus, in one or more embodiments, the simulation application 118 has access to each of the circular buffers corresponding to the players identified as involved in the incident.

As shown in FIG. 4, the simulation application 118 can perform an act 414 of obtaining a current circular buffer for the player(s) involved in the incident. In one or more embodiments, the simulation application 118 obtains the current circular buffer(s) by simply saving a copy of the circular buffer as it exists at the point in time that the monitor time has elapsed. In this way, the simulation application 118 can identify a current circular buffer that includes some lead up to the incident, the entirety of the incident, and at least some of the aftermath of the incident.

As shown in FIG. 4, the simulation application 118 can perform an act 416 of providing the current circular buffer to an adjudication model. In particular, the simulation application 118 can provide the current circular buffer for a player as an input to the adjudication model (e.g., a machine learning adjudication model) trained to determine whether the player is at fault for the identified incident. In one or more embodiments, the simulation application 118 can provide additional circular buffers for the other players involved in the incident to enable the adjudication model to accurately determine which of the multiple player (if any) is at fault for the incident.

In one or more embodiments, the adjudication model outputs a simple determination of fault or not at fault. However, the adjudication model may be trained to output other metrics. For example, the adjudication model may be trained to output a percentage of fault. In one or more embodiments, the adjudication model adjudication model outputs a simple fault or no fault decision based on one or more of the players exceeding a threshold percentage of fault. In one or more embodiments, the adjudication model outputs a decision of fault or not at fault based on a combination of a determined percentage of fault between the players as well as a confident score indicating a confidence of the adjudication model that the output is correct.

In addition to an output of fault or not fault, the adjudication model may additionally apply one or more rules to determine an associated penalty. For instance, the adjudication model may be trained to levy a penalty to a player based on a severity of an incident or an impact of the incident to one or more players not considered at fault for the incident. In addition, the adjudication model can consider player specific data, such as a history of incidents for a player, to determine a specific penalty to the player or individual associated with the player account.

In one or more embodiments, the simulation application 118 determines and/or enforces a variety of penalties ranging in levels of severity to players within the simulation environment based on the output indicating a determination of fault and/or associated penalty. By way of example, penalties may be more severe, such as booting a player from a simulation environment upon determining fault of the player in the incident or banning the player from access to a gaming server for a period of time. Alternatively, penalties may be less severe such as asking a player to review rules of conduct after exiting the simulation environment or being placed on probation within a gaming community for a short period of time. In addition, penalties may be more severe based on a player accumulating multiple determinations of fault within one or multiple simulation environments. Moreover, in one or more embodiments, a player history may be utilized by the adjudication model in determining a metric of fault, which may contribute to future determinations of fault (and/or associated penalties) for a given player with a history of violating rules.

As mentioned above, the adjudication model may be implemented on a client device as part of the simulation application 118. For example, the adjudication model may be provided as a feature of the simulation application 118 at download or installation of the application 118 on the client device. In addition, the adjudication model and/or updates to the adjudication model may be provided as part of an application update to an existing application on the client device. For example, in one or more embodiments, the adjudication model on the client device may be a copy of a central or master adjudication model maintained on the server device(s). Accordingly, as the central adjudication model is fine-tuned or periodically updated based on further training data, the client device may periodically download, receive, or otherwise obtain an updated copy of the adjudication model to achieve more accurate adjudication results.

In one or more embodiments, the adjudication model runs as a background process of the simulation application 118. Further, the simulation application 118 may run intermittently or using a variable quantity of computing resources of the client device based on ongoing processing demands of the simulation application 118. For example, where a player is engaged with multiple players at once in an environment that demands a large quantity of processing resources to provide high quality gaming content, the simulation application 118 may stop the process of applying the adjudication model to previously captured player data for a short period of time (e.g., until the end of a race or after a period of high computing demand).

In one or more implementations, the simulation application 118 runs the adjudication model very slowly in order to reduce utilization of processing resources during a period of high computing demand. Alternatively, where a race is done or where the player is not actively engaging with other players and additional computing resources may be available, the simulation application 118 may apply the adjudication model using additional resources. In any of the above examples, the simulation application 118 may apply the adjudication model using a selective quantity of computing resources in order to not interfere with a quality of gaming content provided to a user of the client device.

Figure 5:
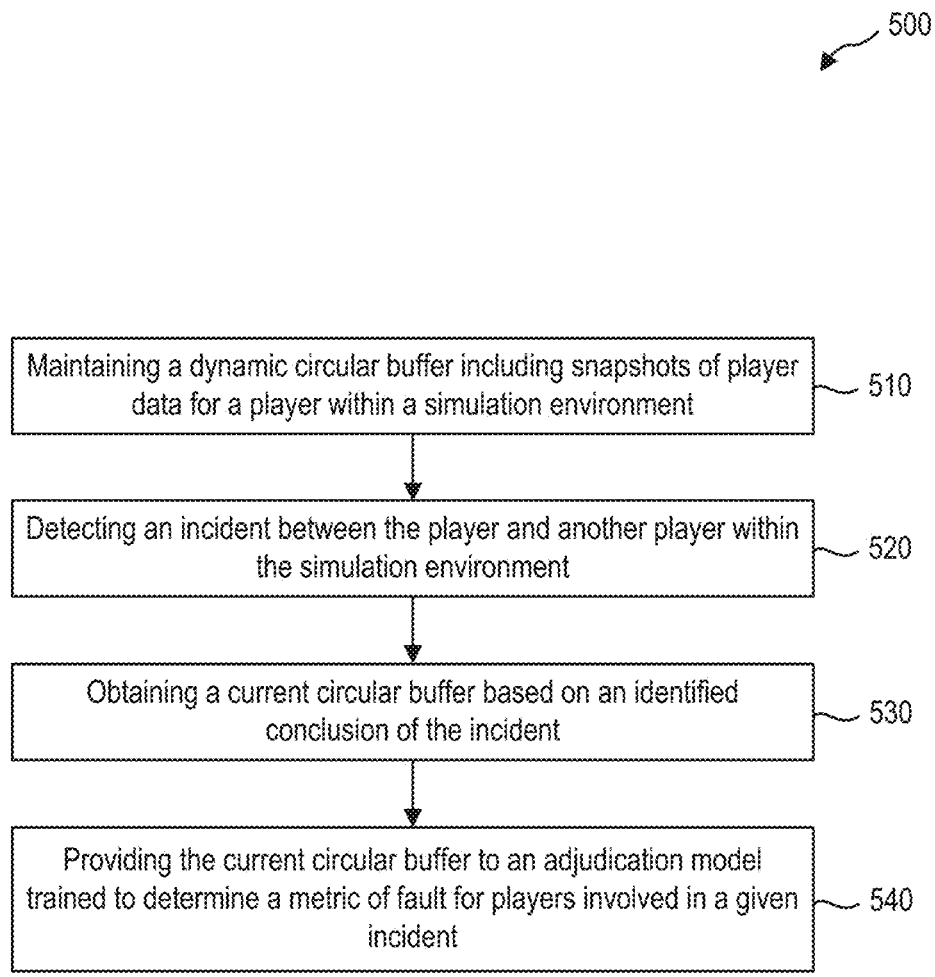
FIG. 5 illustrates an example series of acts for adjudicating an incident between players of a virtual simulation environment based on an adjudication model in accordance with one or more embodiments.

Turning now to FIG. 5, this figure illustrates an example flowchart including a series of acts for adjudicating fault in a simulation environment using a machine learning adjudication model. While FIG. 5 illustrates acts according to one or more embodiments, alternative embodiments may omit, add to, reorder, and/or modify any of the acts shown in FIG. 5. The acts of FIG. 5 can be performed as part of a method. Alternatively, a non-transitory computer-readable medium can comprise instructions that, when executed by one or more processors, cause a computing device (e.g., input device, gaming console, client device) to perform the acts of FIG. 5. In still further embodiments, a system can perform the acts of FIG. 5.

FIG. 5 illustrates an example series of acts 500 for adjudicating fault in a simulation environment in accordance with one or more embodiments described herein. As shown in FIG. 5, the series of acts 500 includes an act 510 of maintaining a dynamic circular buffer including snapshots of player data for a player within a simulation environment. For example, in one or more implementations, the act 510 involves maintaining, for a player in a simulation environment of an application, a circular buffer, the circular buffer including captured states of player data for the player over a predetermined period of time within the simulation environment.

As further shown in FIG. 5, the series of acts 500 includes an act 520 of detecting an incident between the player and another player within the simulation environment. For example, in one or more implementations, the act 520 involves detecting an incident between the player and one or more additional players within the simulation environment. In one or more embodiments, the incident refers to a set of one or multiple collisions between the player and one or more additional players within the simulation environment.

As further shown in FIG. 5, the series of acts 500 includes an act 530 of obtaining a circular buffer based on an identified conclusion of the incident. For example, in one or more implementations, the act 530 involves obtaining a current version of the circular buffer based on an identified conclusion of the incident between the player and the one or more additional players within the simulation environment.

In one or more implementations, maintaining the circular buffer includes capturing a plurality of states of player data for the player at corresponding points in time over the predetermined period of time. In one or more implementations, obtaining the current circular buffer includes capturing a current state of player data for the player including physics data and metadata for the player at a timestamp associated with a determined conclusion of the incident. Obtaining the current circular buffer may further include updating the circular buffer by including the current state of player data and discarding a least recent state of player data from the circular buffer. In one or more embodiments, identifying the incident includes detecting a collision having a threshold measure of impact between the player and the one or more additional players. In one or more implementations, identifying the incident includes determining a conclusion of the incident based on a threshold period of time in which the player has not collided with at least one of the one or more additional players. In one or more embodiments, obtaining the current version of the circular buffer includes saving a copy of the circular buffer as it exists at the timestamp associated with the determined conclusion of the incident between the player and one or more additional players within the simulation environment.

As further shown in FIG. 5, the series of acts 500 includes an act 540 of providing the circular buffer to an adjudication model trained to determine a metric of fault for players involved in a given incident. For example, in one or more implementations, the act 540 involves providing the current version of the circular buffer to an adjudication model trained to output a fault determination for a given player based on a sequence of states of player data for the given player.

In one or more embodiments, the series of acts 500 further include applying the adjudication model to the current version of the circular buffer to determine a metric of fault for the player in relation to the incident between the player and the one or more additional players within the simulation environment. In one or more implementations, the adjudication model includes a machine learning model trained to receive an input including a plurality of states of player data for the given player over a duration of time and generate an output including the fault determination for the given player based on the player data from the plurality of states.

In one or more implementations, the series of acts 500 are performed on a client device. In one or more implementations, the client device includes a gaming console running the application thereon having the adjudication model implemented on the gaming console as a feature of the application. In one or more embodiments, the adjudication model runs as a background process within the application on the gaming console using a selective quantity of processing resources of the gaming console based on a current demand for processing resources of the application.

In one or more embodiments, the simulation environment includes a plurality of players. Further, the series of acts 500 may include concurrently generating a plurality of dynamic circular buffers for the plurality of players within the simulation environment.

In one or more embodiments, the adjudication model includes a copy of a central adjudication model maintained on a server device. Further, the series of acts 500 may include updating the copy of the adjudication model when performing an update of the application on the client device.

Figure 6:
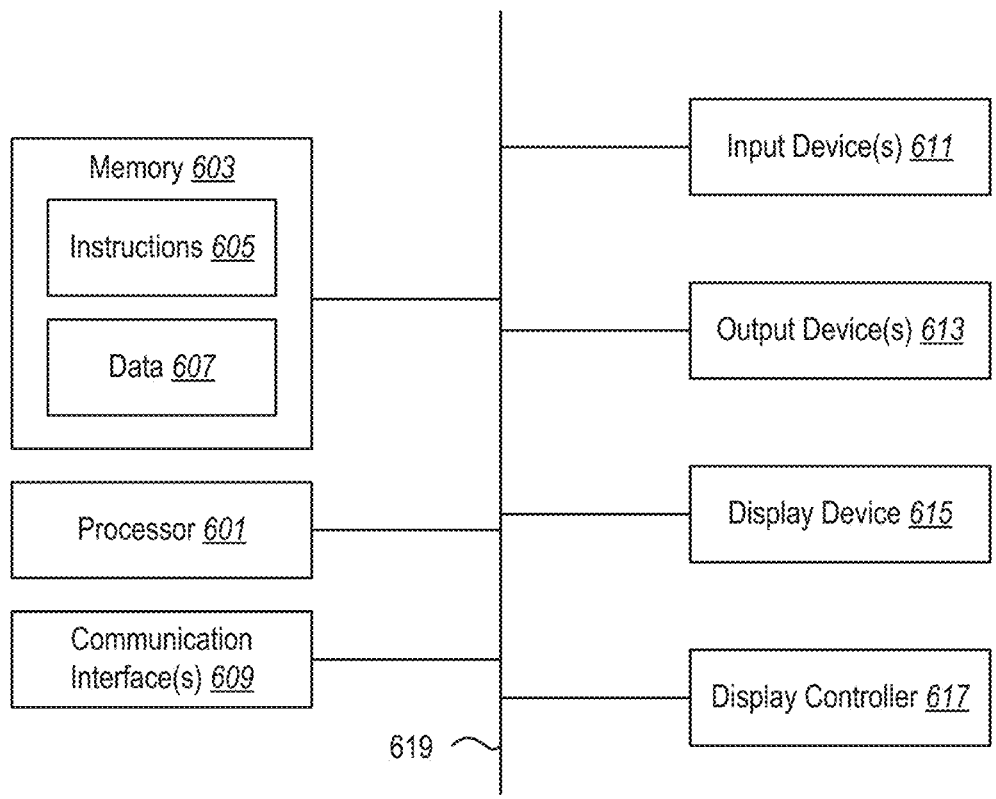
FIG. 6 illustrates certain components that may be included within a computer system.

FIG. 6 illustrates certain components that may be included within a computer system 600. One or more computer systems 600 may be used to implement the various devices, components, and systems described herein.

The computer system 600 includes a processor 601. The processor 601 may be a general purpose single- or multi-chip microprocessor (e.g., an Advanced RISC (Reduced Instruction Set Computer) Machine (ARM)), a special-purpose microprocessor (e.g., a digital signal processor (DSP)), a microcontroller, a programmable gate array, etc. The processor 601 may be referred to as a central processing unit (CPU). Although just a single processor 601 is shown in the computer system 600 of FIG. 6, in an alternative configuration, a combination of processors (e.g., an ARM and DSP) could be used.

The computer system 600 also includes memory 603 in electronic communication with the processor 601. The memory 603 may be any electronic component capable of storing electronic information. For example, the memory 603 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 605 and data 607 may be stored in the memory 603. The instructions 605 may be executable by the processor 601 to implement some or all of the functionality disclosed herein. Executing the instructions 605 may involve the use of the data 607 that is stored in the memory 603. Any of the various examples of modules and components described herein may be implemented, partially or wholly, as instructions 605 stored in memory 603 and executed by the processor 601. Any of the various examples of data described herein may be among the data 607 that is stored in memory 603 and used during execution of the instructions 605 by the processor 601.

A computer system 600 may also include one or more communication interfaces 609 for communicating with other electronic devices. The communication interface(s) 609 may be based on wired communication technology, wireless communication technology, or both. Some examples of communication interfaces 609 include a Universal Serial Bus (USB), an Ethernet adapter, a wireless adapter that operates in accordance with an Institute of Electrical and Electronics Engineers (IEEE) 802.11 wireless communication protocol, a Bluetooth wireless communication adapter, and an infrared (IR) communication port.

A computer system 600 may also include one or more input devices 611 and one or more output devices 613. Some examples of input devices 611 include a keyboard, mouse, microphone, remote control device, button, joystick, trackball, touchpad, and lightpen. Some examples of output devices 613 include a speaker and a printer. One specific type of output device that is typically included in a computer system 600 is a display device 615. Display devices 615 used with embodiments disclosed herein may utilize any suitable image projection technology, such as liquid crystal display (LCD), light-emitting diode (LED), gas plasma, electroluminescence, or the like. A display controller 617 may also be provided, for converting data 607 stored in the memory 603 into text, graphics, and/or moving images (as appropriate) shown on the display device 615.

The various components of the computer system 600 may be coupled together by one or more buses, which may include a power bus, a control signal bus, a status signal bus, a data bus, etc. For the sake of clarity, the various buses are illustrated in FIG. 6 as a bus system 619.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method performed by a client device, comprising:
   maintaining, for a player in a simulation environment of an application, a circular buffer, the circular buffer including captured states of player data for the player over a predetermined period of time within the simulation environment;
   detecting an incident between the player and one or more additional players within the simulation environment;
   obtaining a current version of the circular buffer based on an identified conclusion of the incident between the player and the one or more additional players within the simulation environment; and
   providing the current version of the circular buffer to an adjudication model trained to output a fault determination for a given player based on a sequence of states of player data for the given player.

2. The method of claim 1, further comprising applying the adjudication model to the current version of the circular buffer to determine a metric of fault for the player in relation to the incident between the player and the one or more additional players within the simulation environment.

3. The method of claim 1, wherein the adjudication model comprises a machine learning model trained to:
   receive an input including a plurality of states of player data for the given player over a duration of time; and
   generate an output including the fault determination for the given player based on the player data from the plurality of states.

4. The method of claim 1, wherein the client device includes a gaming console running the application thereon, and wherein the adjudication model is implemented on the gaming console as a feature of the application.

5. The method of claim 4, wherein the adjudication model runs as a background process of the application on the gaming console using a selective quantity of processing resources of the gaming console based on a current demand for processing resources of the application.

6. The method of claim 1, wherein the incident refers to a set of one or multiple collisions between the player and the one or more additional players within the simulation environment.

7. The method of claim 1, wherein maintaining the circular buffer comprises capturing a plurality of states of player data for the player at corresponding points in time over the predetermined period of time.

8. The method of claim 7, wherein obtaining the current version of the circular buffer comprises:
   capturing a current state of player data for the player including physics data and metadata for the player at a timestamp associated with a determined conclusion of the incident; and
   updating the circular buffer by including the current state of player data and discarding a least recent state of player data from the circular buffer.

9. The method of claim 8, wherein obtaining the current version of the circular buffer comprises saving a copy of the circular buffer as it exists at the timestamp associated with the determined conclusion of the incident between the player and one or more additional players within the simulation environment.

10. The method of claim 1, wherein identifying the incident comprises:

detecting a collision having a threshold measure of impact between the player and the one or more additional players; and determining a conclusion of the incident based on a threshold period of time in which the player has not collided with at least one of the one or more additional players.

11. The method of claim 1, wherein the simulation environment includes a plurality of players, and wherein the method comprises concurrently maintaining a plurality of circular buffers for the plurality of players within the simulation environment.

12. The method of claim 1, wherein the adjudication model comprises a copy of a central adjudication model maintained on a server device, the method further comprising updating the copy of the adjudication model when performing an update of the application on the client device.

13. A client device, comprising:
one or more processors;
memory in electronic communication with the one or more processors; and
instructions stored in the memory, the instructions being executable by the one or more processors to:
    maintain, for a player in a simulation environment of an application, a circular buffer, the circular buffer including captured states of player data for the player over a predetermined period of time within the simulation environment;
    detect an incident between the player and one or more additional players within the simulation environment;
    obtain a current version of the circular buffer based on an identified conclusion of the incident between the player and the one or more additional players within the simulation environment; and
    provide the current version of the circular buffer to an adjudication model trained to output a fault determination for a given player based on a sequence of states of player data for the given player.

14. The system of claim 13, further comprising instructions being executable by the one or more processors to apply the adjudication model to the current version of the circular buffer to determine a metric of fault for the player in relation to the incident between the player and the one or more additional players within the simulation environment, wherein the adjudication model comprises a machine learning model.

15. The system of claim 13,
wherein the client device includes a gaming console running the application thereon, and wherein the adjudication model is implemented on the gaming console as a feature of the application, and
wherein the adjudication model runs as a background process of the application on the gaming console.

16. The system of claim 13,
wherein maintaining the circular buffer comprises capturing a plurality of states of player data for the player at corresponding points in time over the predetermined period of time, and
wherein obtaining the current version of the circular buffer comprises:
    capturing a current state of player data for the player including physics data and metadata for the player at a timestamp associated with a determined conclusion of the incident; and
    updating the circular buffer by including the current state of player data and discarding a least recent state of player data from the circular buffer.

17. A non-transitory computer readable medium including instructions thereon that, when executed by at least one processor, causes a client device to:
    maintain, for a player in a simulation environment of an application, a circular buffer, the circular buffer including captured states of player data for the player over a predetermined period of time within the simulation environment;
    detect an incident between the player and one or more additional players within the simulation environment;
    obtain a current version of the circular buffer based on an identified conclusion of the incident between the player and the one or more additional players within the simulation environment; and
    provide the current version of the circular buffer to an adjudication model trained to output a fault determination for a given player based on a sequence of states of player data for the given player.

18. The non-transitory computer readable medium of claim 17, further comprising instructions that, when executed by the at least one processor, causes the client device to apply the adjudication model to the current version of the circular buffer to determine a metric of fault for the player in relation to the incident between the player and the one or more additional players within the simulation environment, wherein the adjudication model comprises a machine learning model.

19. The non-transitory computer readable medium of claim 17,
wherein the client device includes a gaming console running the application thereon, and wherein the adjudication model is implemented on the gaming console as a feature of the application, and
wherein the adjudication model runs as a background process of the application on the gaming console.

20. The non-transitory computer readable medium of claim 17,
wherein maintaining the circular buffer comprises capturing a plurality of states of player data for the player at corresponding points in time over the predetermined period of time, and
wherein obtaining the current version of the circular buffer comprises:
    capturing a current state of player data for the player including physics data and metadata for the player at a timestamp associated with a determined conclusion of the incident; and
    updating the circular buffer by including the current state of player data and discarding a least recent state of player data from the circular buffer.

* * * * *